(12) United States Patent
Kahler, Jr. et al.

(10) Patent No.: US 6,568,556 B1
(45) Date of Patent: May 27, 2003

(54) FUEL TANK BAFFLE

(75) Inventors: Richard Wayne Kahler, Jr., Taylor, MI (US); Duane Allen Fish, Brighton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/252,205

(22) Filed: Sep. 23, 2002

(51) Int. Cl.[7] .................................................. B65D 1/42
(52) U.S. Cl. ...................... 220/563; 220/4.14; 137/574; 137/576
(58) Field of Search ................................. 220/562, 563, 220/4.14; 137/574, 576

(56) References Cited

U.S. PATENT DOCUMENTS

| | | | |
|---|---|---|---|
| 1,310,517 A | 7/1919 | Xardell | |
| 1,341,965 A | 6/1920 | Xardell | |
| 1,562,074 A | 11/1925 | Baum | |
| 1,616,008 A | 2/1927 | Stout | |
| 4,170,877 A | * 10/1979 | Pickering | 60/592 |
| 4,350,258 A | 9/1982 | Rogers | |
| 4,526,286 A | 7/1985 | Jung et al. | |
| 4,550,848 A | * 11/1985 | Sucato | 220/501 |
| 5,251,772 A | * 10/1993 | Toguchi | 220/6 |
| 5,850,933 A | 12/1998 | Pazik | |
| 5,960,981 A | * 10/1999 | Dodson et al. | 220/563 |
| 6,116,454 A | 9/2000 | Henderson et al. | |
| 6,138,859 A | 10/2000 | Aulph et al. | |
| 6,220,287 B1 | 4/2001 | Wolf | |
| 6,338,420 B1 | 1/2002 | Pachciarz et al. | |
| 6,431,388 B1 | * 8/2002 | Spickelmire et al. | 220/563 |

* cited by examiner

*Primary Examiner*—Joseph M. Moy
(74) *Attorney, Agent, or Firm*—Brinks Hofer Gilson & Lione

(57) ABSTRACT

A method and apparatus for preventing vehicle instability from sloshing fuel and aiding in the structural strength of a vehicle fuel tank by using a vee-shaped baffle that is inserted into the warm fuel tank a predetermined distance and plastic welded inside the plastic fuel tank.

26 Claims, 4 Drawing Sheets

FUEL TANK BAFFLE

BACKGROUND OF THE INVENTION

1. Field of the Invention

The present invention relates to an article and a method to provide improved fuel tank components in a motor-vehicle, and in particular, a welded baffle component to be used in motor vehicle fuel tanks.

2. Description of the Prior Art

Baffles have been used for many years in fuel tanks to reduce the effect of the fuel sloshing when the vehicle is in motion. When a vehicle is moving, fuel can flow rapidly from one side of the tank to the other. In a fuel tank without a baffle, the fuel sloshing within a tank can cause instability in the vehicle and reduce control and potentially cause it to swerve or tip over. Additionally, the sloshing of a large amount of fuel against the walls of the tank can cause severe structural strains on the tank walls. A correctly placed baffle interrupts the sloshing fuel and slows the fuel wave so the effect of the fuel movement is less, thereby increasing the stability of the vehicle and reducing the strain on the walls of the tank.

Baffles in fuel tanks are becoming more important as larger automobiles are being produced by the automakers. Large-sized sports utility vehicles are now common on the road. Automakers have many even larger sports-utility vehicles planned for release in the next few years. These large vehicles have poor fuel efficiency compared to smaller vehicles and require larger fuel tanks. They also have a higher center of gravity than typical passenger vehicles, which makes them inherently less stable than passenger vehicles. With large volumes of fuel slosh, vehicle stability and control can become an issue. Using effective baffles in these vehicles reduces concerns.

There are two critical aspects of baffle design: the attachment method of the baffle to the fuel tank and the shape of the baffle. Baffle design must also be balanced with weight, cost and ease of manufacture considerations. Because of the weight issue, the majority of fuel tanks used on passenger vehicles are plastic, so the attachment method must be consistent with plastics manufacturing. Plastic fuel tanks are, however, not as strong as metal and require the baffle to also act as a support mechanism for the tank.

According to NASA studies for rocket fuel tanks, the ideal baffle design is made up of rigid annular rings. These rings, however, add a significant amount of weight to a vehicle and make the tank unduly heavy. This is not acceptable in automobile design where weight is such a significant factor.

U.S. Pat. No. 6,220,287 B1 issued to Wolf uses a plurality of semi-round baffles in different locations extending from the inner side walls of the tank towards the center. While lighter than the annular ring design, the manufacturing of a tank containing these baffles would encompass multiple process steps to attach the many baffles and would be cost-prohibitive in the auto industry.

In U.S. Pat. No. 5,850,933 issued to Pazik, a plastic molded fuel tank is described which contains a traverse baffle that is molded into the tank. While the manufacturing is simplified in this design, the baffle design is non-ideal because the baffle only supports the plastic tank in one direction.

In U.S. Pat. No. 4,526,286 issued to Jung et al., a thermoplastic fuel tank is also described where the baffles are molded into the tank. The baffles are protrusions from the tank walls with openings in the baffles. This is a better baffle design for dampening and strength because of the openings and two-direction strengthening. However, the baffle protrusions and openings in the baffles make for a very complicated molding tool with many slides and steps. The cycle time in the tool is thus increased, making it less feasible for the high volume automotive industry.

Many of the above concerns are dealt with in U.S. Pat. No. 4,350,258 issued to Rogers. The fuel tank baffle is mounted in an interlocking arrangement to the fuel tank. In this patent, a simple baffle is added to the fuel tank without complicating the manufacturing, but the added component creates a rattle risk. An interlocking arrangement can loosen over time and cause the noise that a vehicle driver or passenger may complain about.

Welding of the baffle to the fuel tank was described in U.S. Pat. No. 1,562,074 issued to Baum. The weld could not be made inside the metal tank. The baffle protruded through the tank and was welded from the outside. This method of welding from the outside created a weak point at the joint, which is undesirable.

From the above it is seen that there remains a need for a system and method of manufacturing a baffle inside a vehicle fuel tank that is cost effective for mass production, prevents sloshing fuel from causing vehicle instability, minimizes weak points, aids in the structural integrity of the fuel tank and fits securely to prevent noise.

SUMMARY OF THE INVENTION

In accordance with the present invention, a fuel tank baffle is provided where a vee-shaped baffle is plastic welded to the interior of the plastic fuel tank. The baffle is welded to the fuel tank while the fuel tank is still hot from thermoforming.

A fuel tank, made up of a thermoplastic material, is generally manufactured using a thermoforming process. When the tank is cooled enough to retain its shape, but still hot from the thermoforming process, the plastic baffle is placed inside the warm fuel tank. The baffle is then plastic welded to the fuel tank at the top of the baffle.

The baffle is a vee with a rounded vertex at its bottom, the bottom portion hereinafter referred to as the vertex. The vee-shape allows the baffle to support the fuel tank while the fuel tank cools and gives the fuel tank added structural support when in use in a vehicle.

In the preferred embodiment of the invention, a series of holes perforate the baffle to keep the fuel flowing from the front of the vehicle to the back of the vehicle or back to front or side to side at a minimum velocity. Braces are added to the sides of the baffle to increase the rigidity of the baffle. The top of the vee have two sets of stepped "feet" sticking outward therefrom. The ends of the feet serve two purposes. One set of feet sink into the warm fuel tank to gain better retention of the baffle by the fuel tank. The second set of feet creates a positive stop point for the insertion of the baffle to the fuel tank to aid the assembly.

Advantages of the present invention include the manufacturing of the baffle apart from the manufacture of the fuel tank. The shape of the baffle is not limited by the shape of the fuel tank, as in previous designs, since it is manufactured separately. The unrestricted unique shape of the baffle also reduces the noise of the fuel sloshing back and forth in the tank. The fuel tank can be produced cheaply and efficiently by not having to consider the geometry of the baffle in the tool design. The baffle can be molded separately, allowing for an ideal shape for a fuel tank baffle, without complicated molding. The finished product is lightweight and has high structural integrity for a plastic component.

Additional benefits and advantages of the present invention will become apparent to those skilled in the art to which the present invention relates from the subsequent description of the preferred embodiments and the appended claims, taken in conjunction with the accompanying drawings.

DETAILED DESCRIPTION OF THE PREFERRED EMBODIMENT

Figure 1:
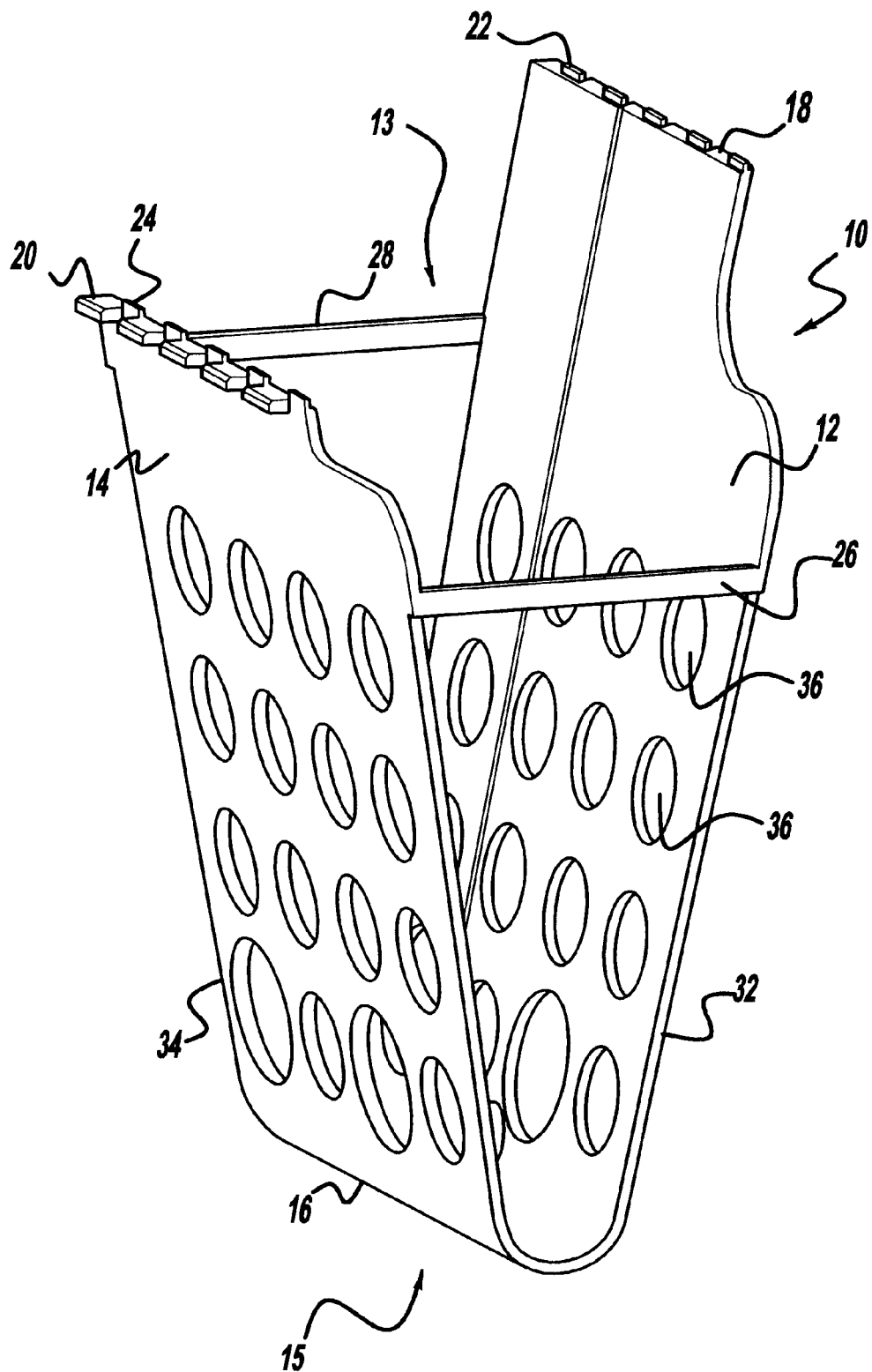
FIG. 1 is a perspective view of an embodiment of the fuel tank baffle of the present invention.

Referring now to the drawings, as seen in FIG. 1, a fuel tank baffle 10 according to the principles of the present invention is perspectively shown. The baffle 10 is generally of a vee-shape and has an open end 13 and a closed end 15 and has two sides, 12 and 14. The sides 12 and 14 are differing heights to conform to the fuel tank 50 (shown in FIG. 3) and are herein referred to as short side 14 and tall side 12. While the sides 12 and 14 differ in height in this embodiment, they may alternatively be of the same height. The short side 14 and tall side 12 converge to the closed end 15 at the bottom of the baffle 10 in a vertex 16.

At the top of each side 12 and 14 are stepped feet for attaching the baffle 10 to the fuel tank 50. The stepped feet consist of axial feet 22 and 24 and lateral feet 18 and 20. A series of axial feet 24 are arranged in an alternating fashion between a series of lateral feet 20 atop the open end of the short side 14. A series of the axial feet 22 are also arranged in an alternating fashion between the series of lateral feet 18 atop the open end of the tall side 12. The axial feet 24 and 22 are generally aligned with the sides 14 and 12, respectively. The lateral feet 20 and 28 are generally projecting outward from the sides 14 and 12, respectively.

The sides 12 and 14 are structurally supported by braces 26 and 28. The braces 26 and 28 serve to prevent deformation of the baffle 10 when in use in a vehicle. Brace 26 extends laterally from side 12 to side 14 on edge 32. Brace 28 is on the side of the baffle 10 opposing brace 26 and extends from side 12 to side 14 on edge 34.

As readily seen in FIG. 1, perforations 36 are distributed throughout side walls 12 and 14. The perforations 36 serve to direct flow and slow fuel sloshing in the fuel tank 50 when the vehicle is in operation. The perforations 36 are preferably of a generally round or oval shape, but other shapes are also possible. The perforations 36 may be of uniform size or varying size, and are set in an optimized shape and size pattern for controlling and slowing the fuel flow for different size and design fuel tank applications, as determined by engineering evaluation for each application.

Figure 2:
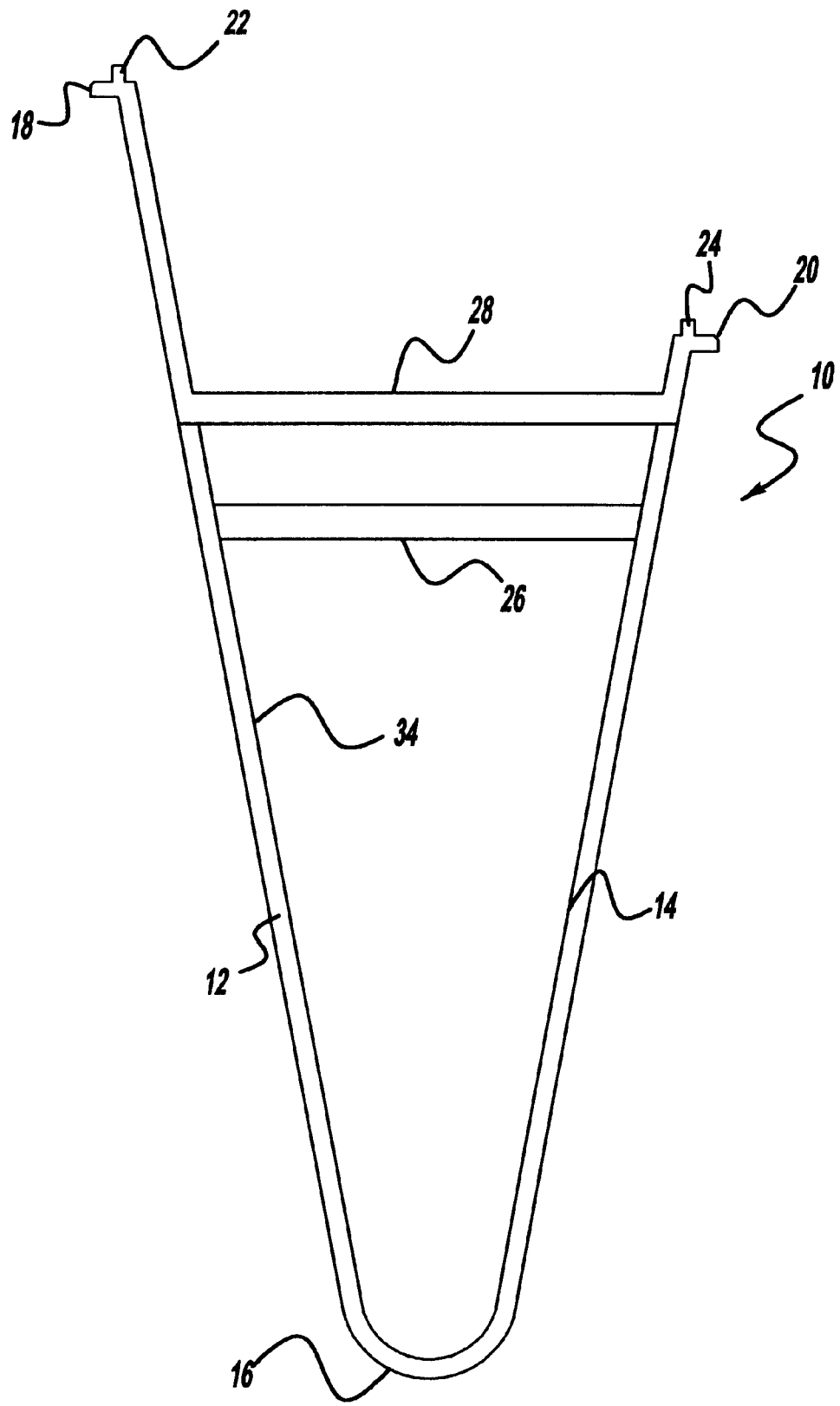
FIG. 2 is a side view of the fuel tank baffle.

Referring now to FIG. 2, a side view of the baffle 10 is shown facing edge 34. The general vee-shape of the baffle 10 is clearly viewed in FIG. 2 as tall side 12 and short side 14, and rise from the vertex 16 at the bottom of the baffle 10. Axial feet 22, 24 are shown generally extending in the planes of sides 12 and 14, while lateral feet 18, 20 extend outwards therefrom. Braces 26 and 28, extending between the sides 12 and 14, are staggered in their distance from vertex 16 to add strength and reduce flexing of the baffle 10 during vehicle operation.

Figure 3:
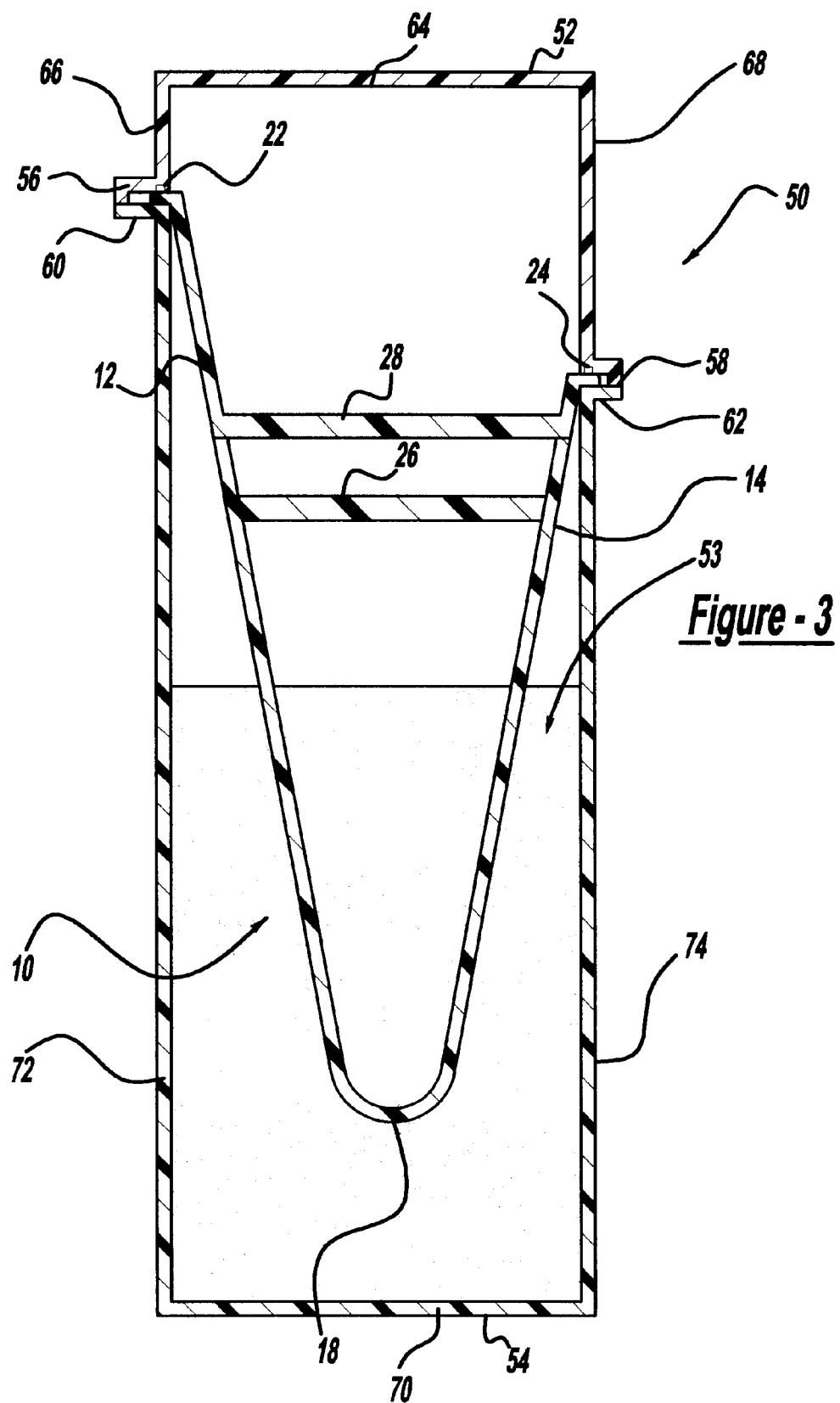
FIG. 3 is a perspective view of the baffle as it is assembled to the fuel tank.

Referring now to FIG. 3, the baffle 10 is shown in a similar side view as in FIG. 2, however, in FIG. 3, the fuel tank 50 is now assembled about the baffle 10.

The fuel tank 50 consists of top half 52 and bottom half 54. Top half 52 is made up of a top wall 64 and side walls 66 and 68. The side walls 66 and 68 terminate in perimeter flanges 56 and 58, respectively. Bottom half 54 consists of bottom wall 70 and side walls 72 and 74. The side walls 72 and 74 terminate in perimeter flanges 60 and 62, respectively, which correspond with the flanges 56, 58 of the top half 52. The top half 52 and bottom half 54 cooperate to define an internal chamber 53 of the fuel tank 50 to contain fuel and baffle 10.

The top half 52 and bottom half 54 are generally manufactured using thermoforming. While the top half 52 is still warm from processing, the baffle 10 is assembled to the top half 52. The axial feet 22 on tall side 12 partially melt into the top perimeter flange 56 during assembly. The axial feet 24 on short side 14 partially melt into the perimeter flange 58 during assembly. The warm bottom half 54 is then assembled to the top half 52 capturing the baffle 10 between the perimeter flanges 56, 58 of top half 52 and perimeter flanges 60, 62 of bottom half 54, respectively. The perimeter flanges 56, 58, 60 and 62 may then be further secured together by conventional mechanical means.

Figure 4:
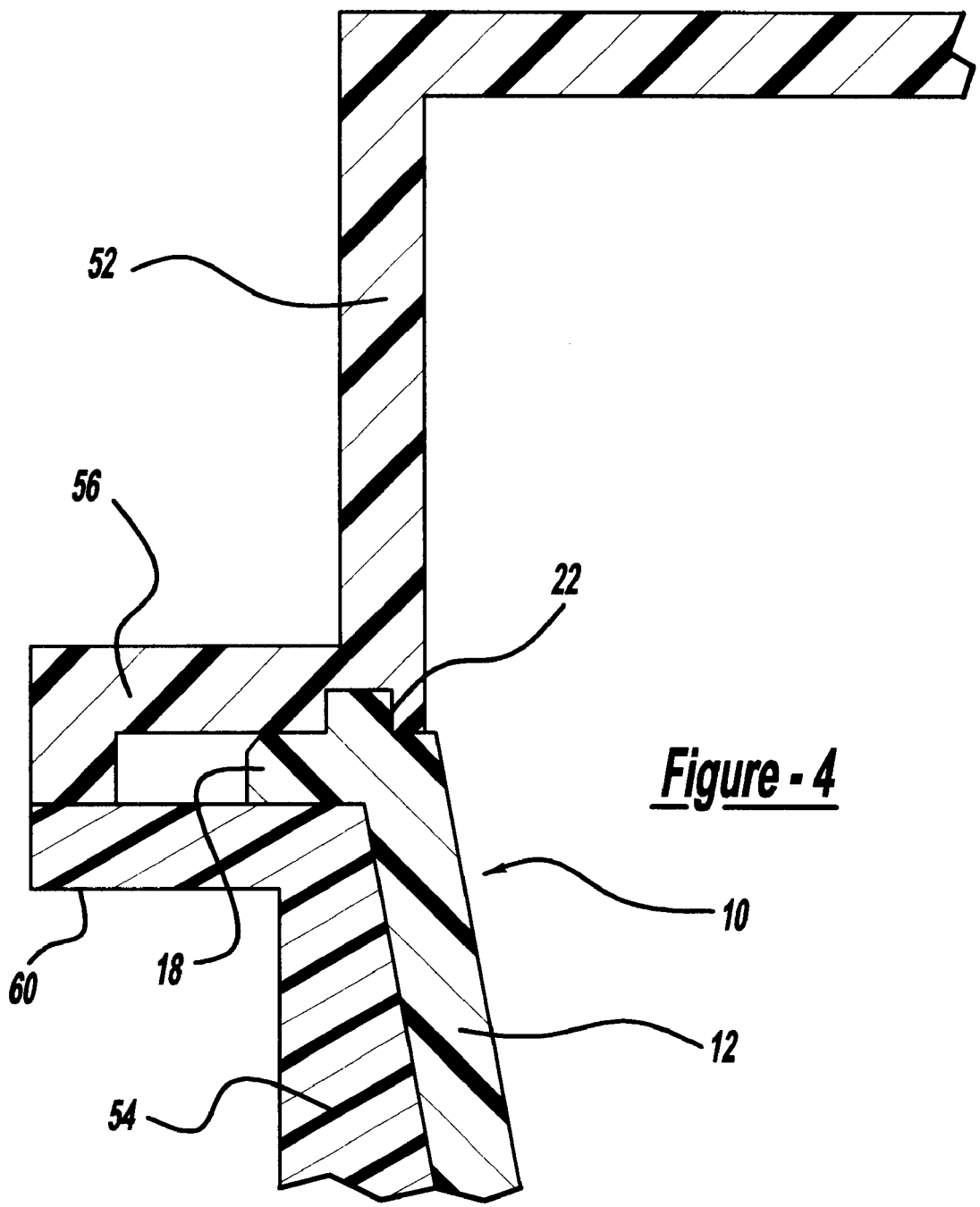
FIG. 4 is a side view of a close-up of the attachment of the baffle to the fuel tank.

Referring now to FIG. 4, a close-up view of the attachment between the baffle 10 and the fuel tank 50 is shown at the top of tall side 12. The axial feet 22 extend into and are partially melted into the top half 52 at top perimeter flange 56 upon assembly. Positive feedback is felt as the operator assembles the baffle 10 to the top half 52 when the top of the lateral feet 18 contact the flange 56, stopping the operator from further pushing the baffle 10 into the fuel tank 50. The bottom half 54 is then assembled to the top half 52 and baffle 10 assembly to capture the baffle 10 between the top half 52 and bottom half 54 at perimeter flange 56 and perimeter flange 60. The perimeter flanges 56, 58, 60 and 62 may then be further secured together by conventional mechanical means.

While the above description constitutes the preferred embodiments of the present invention, it will be appreciated that the invention is susceptible to modification, variation and change without departing from the proper scope and fair meaning of the accompanying claims.

We claim:

1. A vehicle fuel tank assembly comprising:

a fuel tank having first and second halves;

a baffle generally having two sides rising from a connected bottom portion and terminating at an open end, at least one of said sides have perforations therein, said baffle including a plurality of feet extending from said sides at said open end; and wherein at least some of said feet of said baffle extend into a portion of said fuel tank thereby attaching said baffle to said fuel tank.

2. The assembly of claim 1 further comprising stop members, said stop members limiting the depth to which said at least some of said feet extend into said portion of said fuel tank.

3. The assembly of claim 2 wherein said stop members are formed by others of said feet.

4. The assembly of claim 1 wherein said feet include a first set of feet and a second set of feet, said first set of said feet extending into said portion of said fuel tank and said second set of said feet limiting the depth to which said first set of feet extends.

5. The assembly of claim 4 wherein said first set of feet are generally planar with said sides of said baffle.

6. The assembly of claim 5 wherein said second set of feet extend generally outward with respect to said sides of said baffle.

7. The assembly of claim 4 wherein said first and second sets of feet are alternatingly arranged with one foot of said second set being located between adjacent feet of said first set.

8. The assembly of claim 1 wherein said sides of said baffle are of the same height.

9. The assembly of claim 1 wherein said sides of said baffle are of differing heights.

10. The assembly of claim 1 further comprising at least one brace extending between said sides of said baffle.

11. The assembly of claim 1 wherein said feet comprise feet of at least two different lengths.

12. The assembly of claim 1 wherein said baffle is generally vee-shaped.

13. The assembly of claim 1 wherein said fuel tank and said baffle are formed of plastic.

14. The assembly of claim 13 wherein said at least some of said feet extending into said portion of said fuel tank are fused with said portion of said fuel tank.

15. A fuel tank baffle comprising a body having two diverging sides connected at a bottom portion and extending therefrom until terminating at an open end of said body, said sides having perforations distributed therein, said sides terminating in ends having a plurality of feet extending therefrom, said feet including at least two sets of feet, one set of said feet adapted to attach said baffle to a fuel tank by extending into a portion of the fuel tank and a second set of said feet adapted to limit the depth to which said first set extends.

16. The baffle of claim 15 wherein said second set of feet extend generally outward with respect to said sides of said baffle.

17. The baffle of claim 15 wherein said first set of said feet extend generally planar with said sides of said baffle.

18. The baffle of claim 17 wherein said second set of feet extend generally outward with respect to said sides of said baffle.

19. The baffle of claim 18 wherein said feet are alternatingly arranged with one foot of said second set being located between two feet of said first set.

20. The baffle of claim 15 wherein said sides are of a common length.

21. The baffle of claim 15 wherein said sides are of differing lengths.

22. The baffle of claim 15 wherein said feet comprise feet of two different lengths.

23. The baffle of claim 15 wherein said body is generally vee-shaped.

24. A method of attaching a plastic baffle to a plastic fuel tank comprising:
   forming first and second halves of a plastic fuel tank;
   providing a baffle having a body with a plurality of feet formed thereon;
   assembling the baffle to said first half of said fuel tank by extending at least some of said feet thereon into said portion of said first half of said fuel tank;
   fusing said plastic of said first half of said fuel tank with said feet of said baffle extended thereinto; and
   assembling said second half of said fuel tank to said first half of said fuel tank so as to retain said baffle within said fuel tank.

25. The method of claim 24 further comprising the step of limiting the depth to which said feet can be extended into said portion of said fuel tank.

26. The method of claim 25 wherein said limiting step is accomplished by others of said feet not extending into said portion of said fuel tank.

* * * * *